May 28, 1957 M. BROWN ET AL 2,793,607
INDICATING INSTRUMENT
Filed Aug. 2, 1954

INVENTORS
MILTON BROWN
MORGAN L. DRING
BY Geo. J. Hyde
ATTORNEY

United States Patent Office 2,793,607
Patented May 28, 1957

2,793,607

INDICATING INSTRUMENT

Milton Brown, Glen Rock, and Morgan Lee Dring, Belleville, N. J., assignors to Bendix Aviation Corporation, Teterboro, N. J., a corporation of Delaware Application August 2, 1954, Serial No. 447,313

4 Claims. (Cl. 116—136.5)

This invention relates to indicating instruments and the like having indicating elements, generally termed pointers herein, and is especially directed to an arrangement for preventing such pointers from sticking.

The invention is of particular value in connection with very delicate instruments, in which the pointer is actuated by extremely slight forces, and its travel is limited by abutments positioned to engage the pointer when it reaches the extremes of its path. It was found that in certain instruments of this type a tendency for the pointer to stick against an abutment developed after a while, and rendered the instrument unreliable.

This defect may be quite serious, especially with certain types of instruments, such as those in aircraft that must be relied on by aviators. Many instruments of the indicated type require relatively large pointers, which must be made of extremely light material because of the very low operating power. Aluminum is generally employed in these cases; and it was found that pointers of this type of material developed the indicated tendency to stick.

An object of this invention is to provide a novel arrangement that will prevent pointers from sticking.

Another object is to provide such an arrangement for preventing the sticking of pointers that are made of aluminum or other very light material.

A further purpose is to provide an arrangement of this type that can be readily applied to existing apparatus. Related objects are to provide an attachment suitable for use with light delicate points that is positive in action, permanent, inexpensive, easily made and applied, and which will not affect the operation or accuracy of the instrument.

It has been discovered that the indicated sticking of pointers against abutments will occur even when the abutments are made of material whose surface is relatively hard and non-adhesive in character. It was found that after repeated contacts some of the pointer metal was deposited on the abutment; and it has been concluded that the sticking may be due to molecular attraction between the deposited metal and the pointer, which of course is made of the same metal. While this attraction is relatively slight, the pointer is moved by such very low power, as already indicated, that even the slight attraction between molecules of the same metal can cause sticking.

This problem is in general solved by providing on the pointer where it contacts the abutment a very small, light surfacing of hard material that is too hard to rub off on the abutment, but is sufficiently light to permit normal operation of the pointer. In the preferred form the surfacing is in the form of a contact plate of hard metal, attached to the pointer at the point of contact with the abutment by adhesion, mechanical engagement or both. It has been found that such a plate can be made small and light enough for use even on very delicate instruments without affecting their operation, while effectively preventing sticking.

An object of the invention therefore is to provide a practical attachment especially suited for use with light, delicate instrument pointers that will prevent sticking at abutments. Another object is to provide such an attachment that can be readily snapped or clipped onto a pointer. A particular purpose is to provide an attachment readily applied to the pointers of operating instruments that are subject to sticking.

A further object is to provide a device of the indicated type that is particularly small, being limited in size to the area immediately around the point of contact between the pointer and the abutment. This arrangement presents special problems of construction and mounting, in view of the great sensitiveness of the apparatus, but their solution by this invention avoids any material effect on operation, and is much simpler, less expensive and more efficient than arrangements in which all or a large part of the pointer surface is treated.

The foregoing and other objects and advantages of the invention will appear more fully from consideration of the detailed description which follows, in connection with the accompanying drawing wherein one embodiment of the invention is illustrated. It is to be expressly understood, however, that the drawing is for the purposes of illustration and description and is not to be construed as defining the limits of the invention.

The invention is illustrated in its application to an instrument of the electrical meter type, a construction that is used in many types of instruments other than meters. For instance, it is employed in course indicators for aviation use. Only the pointer and its actuating unit are shown, since the invention is incorporated in this portion of the instrument.

Figure 3:
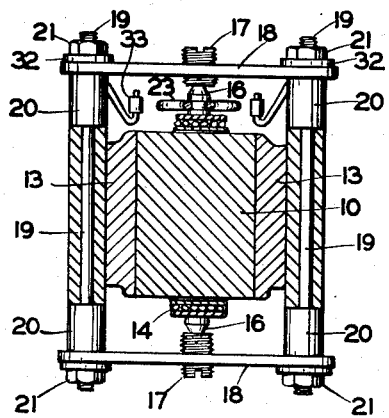
Fig. 3 is a section on line 3—3 of Fig. 1.

In the form illustrated, the pointer operating unit includes a cylindrical permanent magnet 10 and an outer cylindrical concentric flux return path or armature 11 spaced from the magnet 10 by a cylindrical gap 12. Magnet 10 is mounted on armature 11 at opposite sides, as by connecting shoes 13 (Fig. 3).

A galvanometer coil 14 wound on a rectangular metal channel 15 extends around magnet 10 through gap 12, and is pivotally mounted for rotary movement along said gap in a path concentric with magnet 10. For this purpose pointed pivots 16 are coaxially mounted on channel 15 and are rotatable in conical sockets in the ends of bearing screws 17 threaded through cross bars 18. Mounting bolts 19 extending through opposite sides of the armature 11 and provided with spacers 20 at opposite margins of armature 11 extend through the ends of cross bars 18, which are held in place by nuts 21 on bolts 19.

Figure 1:
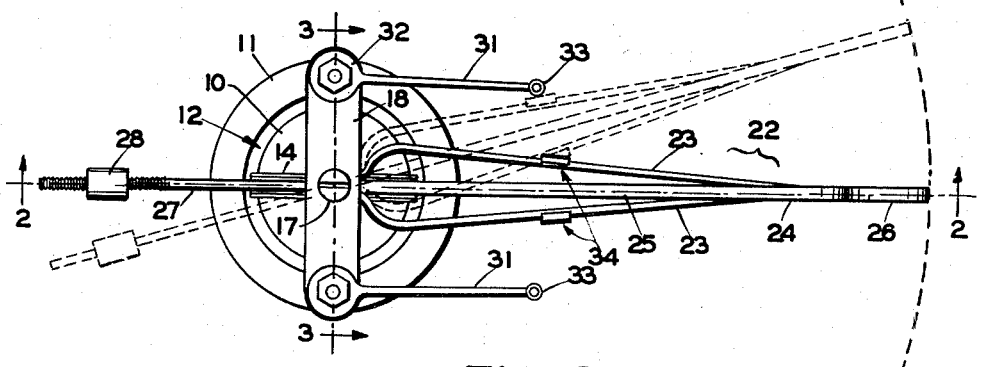
Fig. 1 is a top view of an instrument embodying the invention.
Figure 2:
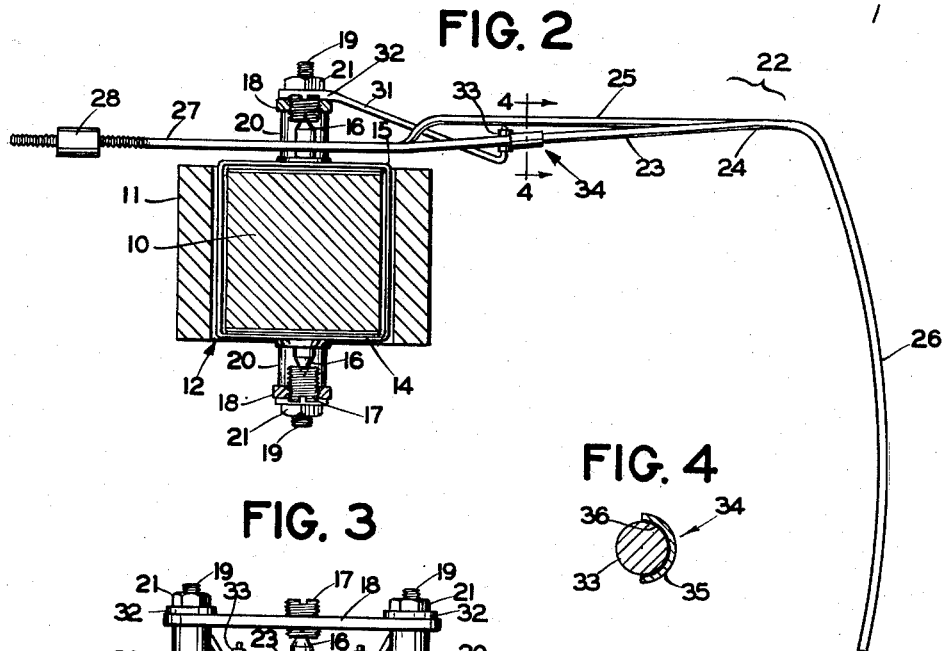
Fig. 2 is a section on line 2—2 of Fig. 1.
Figure 4:
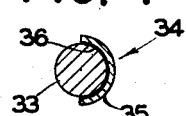
Fig. 4 is an enlarged fragmentary cross section on line 4—4 of Fig. 2, showing one of the contact elements in position, the proportions of the contact element and adhesive being exaggerated in the interests of clearness.

A suitable pointer is fixed to the coil 14. In the form illustrated, pointer 22 is formed with side arms 23 fixed to opposite sides of the upper pivot 16, near which they are laterally deflected, as shown in Fig. 1, and then converge to a junction point 24. A center arm 25 is located between side arms 23, and is deflected upwardly in the central region of the instrument as shown in Fig. 4, converging thence to the junction point 24. At this point the side arms 23 are connected to center arm 25 and continue in the form of a long curved indicator section 26, extending downwardly from junction point 24, and curved to fit the face of a convex dial (not shown). A balance arm 27 is fixed to the pointer arms and extends in line with center arm 25 at the opposite side of pivot 16, being threaded at its outer end portion to receive threaded counterweight 28.

The arrangement thus far described is a somewhat simplified form of an electrical meter type of movement adapted for use with delicate instruments. When direct current is passed through the galvanometer coil 14, the coil will rotate in proportion to the strength of the current, swinging along gap 12, so that the position of the indicator section 26 will show the current strength and polarity, representing the nature of the characteristic that is being indicated. It should be made clear that the construction shown has been very much simplified, since its details form no part of the invention, and involve rather intricate and extensive arrangements used in commercial movements of this type to assure reliable operation in response to the application of extremely slight electrical currents. The disclosure, however, contemplates the use of such well-known features where they are desirable, without affecting the character of the inventive features herein.

Suitable abutments are provided to arrest the lateral swing of pointer 22 when it has reached the limits of desired operation. For this purpose two abutment arms 31 are mounted on the upper cross bar 18, as by attaching them to flat end plates 32 underlying nuts 21, and extend at opposite sides of side arms 23 of the pointer 22. Arms 31 carry suitable abutments positioned to contact the arms 23 when the pointer swings to limiting position on either side.

In the arrangement illustrated, the outer end of each arm 31 is turned upwardly and a cylindrical abutment 33, advantageously formed from a ceramic bead, such as porcelain, is threaded on the arm 31 in position to engage the adjacent pointer side arm 33.

A suitable contact element 34 is attached to the outer side of each side arm 23 in position to engage the adjacent abutment 33. The contact element 34 is formed of material sufficiently resistant to the effect of contact with abutment 33 so that it will not wear off and deposit any substantial amount of its material on the abutment during use. The material of which the contact element 34 is formed must be non-magnetic, and may be made of a plastic or the like sufficiently hard to function as indicated. It may be applied in a solvent which upon evaporation leaves a hard layer of plastic at the contact point. It is located only in a limited area immediately around the point of contact with abutment 33.

However, in the preferred form a contact plate 35 is attached to each side arm 23, either by adhesion, mechanical engagement or both. The plate 36 may be constructed of non-magnetic metal, such as monel metal, nickel, hard anodized aluminum and the like, or may be formed of molded glass fiber or suitable plastics, including plastic materials with hard particles embedded therein, such as bits of mica. The contact plate 35 is advantageously shaped to fit snugly around arm 23 in the contact zone, and may be held in place by adhesion. It may be made of resilient material which can be sprung around arm 23 and will grip the arm, thereby holding itself in place. If desired, both methods of mounting may be used.

In the form shown, the side arms 23 of the pointer 22 are round in cross-section, being formed of thin-walled tubing to combine extreme lightness with maximum strength, though forms other than tubing may be used. The contact plate 35 is semi-cylindrical and very thin, being advantageously constructed of a half section of extremely thin metal tubing, cut so that the plate 35 will extend at least half way around arm 23, and proportioned so that the opposite longitudinal edges of plate 35 will press inwardly against arm 23 and hold the plate firmly in place.

It is of course important with delicate instruments to have plates 35 as light as is practical. In one embodiment plate 35 was made from tubing three thousandths of an inch thick and had a length of one-eighth inch, the inside diameter of the tubing being slightly less than the outside diameter of arm 23. The plate 35 is sprung into place on the arm by pressure and will grip the arm firmly. If desired, a very thin layer 36 of a suitable adhesive may be applied between plate 35 and arm 23. The two plates 35 are of course located symmetrically, and counterweight 28 can be adjusted to rebalance the pointer after the plates are attached.

While aluminum is the preferred metal for pointers of the indicated type, other metals, and particularly magnesium, having the same qualities of extreme lightness and adequate strength may be used, such metals being likewise sufficiently soft to form a deposit on abutments.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. In an indicating instrument, a movable indicating member having at least a portion thereof formed of relatively soft metal, an abutment of substantially harder non-magnetic material located in the path of said portion and constituting a stop for said member, and a shield element of non-magnetic material substantially harder than said portion, fixed to said portion in position to contact the abutment, said shield element and abutment so arranged as to cooperate upon contact in such a manner as to prevent a sticking of the one to the other by molecular attraction.

2. In an indicating instrument, a movable indicating member having a relatively narrow elongated section formed of relatively soft metal, an abutment of substantially harder non-magnetic material located in the path of said section and constituting a stop for said member, and a convex shield element of thin resilient non-magnetic metal having opposite margins engaging said section at opposite sides, located in position to contact the abutment, said shield element and abutment so arranged as to cooperate upon contact in such a manner as to effectively prevent a sticking of the one to the other by molecular attraction.

3. In an indicating instrument, a movable indicating member having a section formed of relatively soft metal, an abutment including a ceramic bead located in the path of said section and constituting a stop for said member, and a sheet of thin non-magnetic material substantially harder than said section overlying and attached to said section in position to contact the ceramic bead of said abutment, said sheet and ceramic bead cooperating upon contact to effectively prevent a sticking of the one to the other by molecular attraction.

4. In an indicating instrument, a movable pointer including a rod formed of aluminum, an abutment including a ceramic bead located in the path of said rod and constituting a stop for said pointer, and a convex sheet of non-magnetic metal substantially harder than aluminum and shorter than the rod, having opposite margins resiliently engaging said section at opposite sides and adhesively fastened to said section in position to contact the ceramic bead of said abutment, said sheet and ceramic bead cooperating upon contact to effectively prevent a sticking of the one to the other by molecular attraction.

(References on following page)

References Cited in the file of this patent

UNITED STATES PATENTS

| | | |
|---|---|---|
| 1,023,304 | Ellis | Apr. 16, 1912 |
| 1,743,354 | Johnson | Jan. 14, 1930 |
| 1,783,559 | Cone | Dec. 2, 1930 |
| 1,877,243 | Ising | Sept. 13, 1932 |
| 2,111,001 | Norman | Mar. 15, 1938 |
| 2,518,928 | Paine | Aug. 15, 1950 |
| 2,571,178 | Allen | Oct. 16, 1951 |
| 2,597,939 | Lamb | May 27, 1952 |

FOREIGN PATENTS

| | | |
|---|---|---|
| 658,125 | Great Britain | October 1951 |